US012524570B2

United States Patent
Renard et al.

(10) Patent No.: US 12,524,570 B2
(45) Date of Patent: Jan. 13, 2026

(54) PRIVACY-PRESERVING PRESENTATION OF CONTENT ITEM BUNDLES

(71) Applicant: Apple Inc., Cupertino, CA (US)

(72) Inventors: Yann J. Renard, San Diego, CA (US); Adeeti V. Ullal, Los Altos, CA (US); Daniel M. Trietsch, San Jose, CA (US); Ehsan Jahangiri, San Bruno, CA (US); Guanling Feng, Santa Clara, CA (US); Hyo Jeong Shin, San Jose, CA (US); Joseph-Alexander P. Weil, San Anselmo, CA (US); Mariah W. Whitmore, San Diego, CA (US); Po An Lin, San Jose, CA (US); Rene F. Aguirre Ramos, Poway, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 18/497,970

(22) Filed: Oct. 30, 2023

(65) Prior Publication Data

US 2024/0403478 A1  Dec. 5, 2024

Related U.S. Application Data

(60) Provisional application No. 63/470,940, filed on Jun. 4, 2023.

(51) Int. Cl.
*G06F 21/62* (2013.01)

(52) U.S. Cl.
CPC .............................. *G06F 21/6245* (2013.01)

(58) Field of Classification Search
CPC ...... G06F 21/60; G06F 21/62; G06F 21/6218; G06F 21/6245; G06F 21/6281
See application file for complete search history.

(56) References Cited

U.S. PATENT DOCUMENTS

| | | | |
|---|---|---|---|
| 9,098,715 B1 * | 8/2015 | Spear, Jr. | G06F 21/604 |
| 9,946,856 B1 | 4/2018 | Grigera | |
| 10,277,601 B1 * | 4/2019 | Higgins | G06F 21/6218 |
| 10,318,759 B2 | 6/2019 | Vaha-Sipila | |
| 11,487,890 B2 * | 11/2022 | Thomson | H04L 67/53 |
| 11,620,329 B2 * | 4/2023 | Dickoff | G06F 16/535 |
| | | | 715/838 |
| 2008/0114844 A1 * | 5/2008 | Sanchez | H04L 67/75 |
| | | | 709/206 |
| 2018/0357319 A1 * | 12/2018 | Sengaru | G06F 16/93 |

OTHER PUBLICATIONS

International Search Report and Written Opinion from PCT/US2024/032122, dated Sep. 27, 2024, 10 pages.

* cited by examiner

*Primary Examiner* — Boris D Grijalva Lobos
(74) *Attorney, Agent, or Firm* — BAKERHOSTETLER

(57) ABSTRACT

The subject system may be implemented by at least one processor configured to, by a system process, receive a request for one or more content item bundles, obtain the one or more content item bundles for presentation of the one or more content item bundles, receive a selection of a content item bundle from the presented one or more content item bundles, and providing, to the application process, one or more content items of the selected content item bundle. The one or more content item bundles are inaccessible to an application process before they are provided to the application process by the system process.

22 Claims, 12 Drawing Sheets

PRIVACY-PRESERVING PRESENTATION OF CONTENT ITEM BUNDLES

CROSS-REFERENCE TO RELATED APPLICATIONS

The present application claims the benefit of U.S. Provisional Patent Application Ser. No. 63/470,940, entitled "PRIVACY-PRESERVING PRESENTATION OF CONTENT ITEM BUNDLES," filed Jun. 4, 2023, which is hereby incorporated herein by reference in its entirety and made part of the present U.S. Utility Patent Application for all purposes.

TECHNICAL FIELD

The present description generally relates to data privacy and, more particularly, to privacy-preserving presentation of content item bundles.

BACKGROUND

An electronic device such as a laptop, tablet, smartphone, or wearable device may include a repository for storing journal entries created by a user that may include content items stored on the electronic device.

BRIEF DESCRIPTION OF THE DRAWINGS

Certain features of the subject technology are set forth in the appended claims. However, for the purpose of explanation, several implementations of the subject technology are set forth in the following figures.

DETAILED DESCRIPTION

Figure 1:
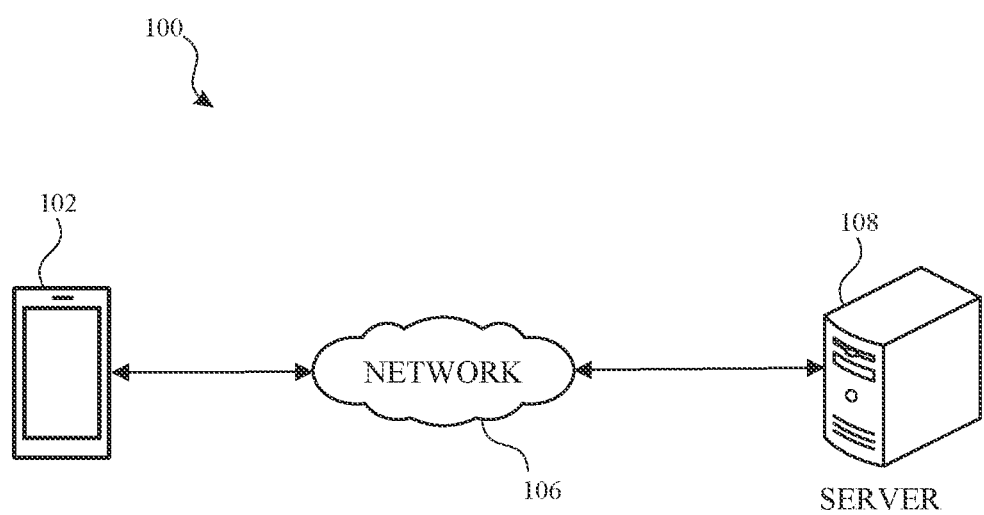
FIG. 1 illustrates an example network environment for privacy-preserving presentation of content item bundles, in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology is directed to privacy-preserving content presentation and/or providing applications with access to content for presentation in a privacy-preserving manner. Aspects of the subject technology segregate the processes of data access and user interface (UI) presentation from an application on a user's device. The system helps preserve a user's data privacy by limiting the application's direct access to potentially sensitive user data such as photos, text messages, location history, activity data, and the like. This may be achieved through the implementation of system processes (e.g., processes of an operating system) that generate content item bundles and present these content item bundles via a user interface separate from application user interfaces and inaccessible by applications.

In the first part of this process, a system process pulls data from various sources within the user's device. These sources could range from high-level data (e.g., application data, such as image galleries and contacts) to low-level data (e.g., sensor data, such as GPS data and activity tracking data). This data may then be used to generate, for example, content item bundles, which may be personalized suggestions for the user. This process may take place independently of the application, preventing it from having direct access to potentially sensitive data.

In the second part of this process, a system process generates a user interface to present the generated content item bundles to the user. This keeps access to the user data isolated from the application and prevents the applications from data mining or viewing the generated content item bundles without some indication of consent from the user. The user interface offers the user an interactive way to view and select these suggestions for access within the applications without jeopardizing the privacy of their data.

Once the user selects a content item bundle from the user interface, the data associated with the selected content item bundle may be retrieved by a system process and provided to the application. The application is prevented from accessing the user data and may only be provided the data that the user directs (e.g., via the selection) the system process to provide.

FIG. 1 illustrates an example network environment 100 for privacy-preserving presentation of content item bundles, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102 and one or more servers (e.g., a server 108). The network 106 may communicatively (directly or indirectly) couple the electronic device 102 and/or the server 108. In one or more implementations, the network 106 may be an interconnected network of devices that may include, or may be communicatively coupled to, the Internet. For explanatory purposes, the network environment 100 is illustrated in FIG. 1 as including the electronic device 102 and the server 108; however, the network environment 100 may include any number of electronic devices and/or any number of servers communicatively coupled to each other directly or via the network 106.

The electronic device 102 may be, for example, a desktop computer, a portable computing device such as a laptop computer, a smartphone, a peripheral device (e.g., a digital camera, headphones), a tablet device, a wearable device (e.g., a watch, a band, and the like), or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 102 may include a campaign client module (and/or circuitry) and one or more applications capable of presenting advertisements. In FIG. 1, by way of example, the electronic device 102 is depicted as a smartphone. The electronic device 102 may be, and/or may include all or part of, the electronic system discussed below with respect to FIG. 10. In one or more implementations, the electronic device 102 may include one or more applications. For example, using a journaling application, a user may create a journal entry by inputting text as a response to an automatically generated prompt and attaching one or more content items (e.g., photos, locations, contacts, and the like). Although the present disclosure may discuss aspects of the subject technology with regard to journaling applications, it should be understood that the subject technology is not limited to journaling applications and may be utilized in any other context where the electronic device 102 aggregates content items and provides them to the user such that they cannot be accessed by applications on the electronic device 102 without an indication of consent by the user.

In one or more implementations, one or more servers such as the server 108 may perform operations for managing the secure exchange of communications data and/or communications session data between various electronic devices such as the electronic device 102. In some variations, the server 108 includes one or more app-specific modules (e.g., plugins) that perform operations for a respective application. In some variations, the server 108 includes one or more push modules for providing asynchronous notifications to one or more electronic devices (e.g., publish-subscribe messaging).

In one or more implementations, the server 108 may also or instead store account information (e.g., account, handles, or any other account-specific data) associated with the electronic device 102 and/or users thereof. In one or more implementations, the server 108 may provide content (e.g., media content, application content, or any other suitable data) that is to be processed at an electronic device (e.g., the electronic device 102) by an application of the electronic device.

Figure 2:
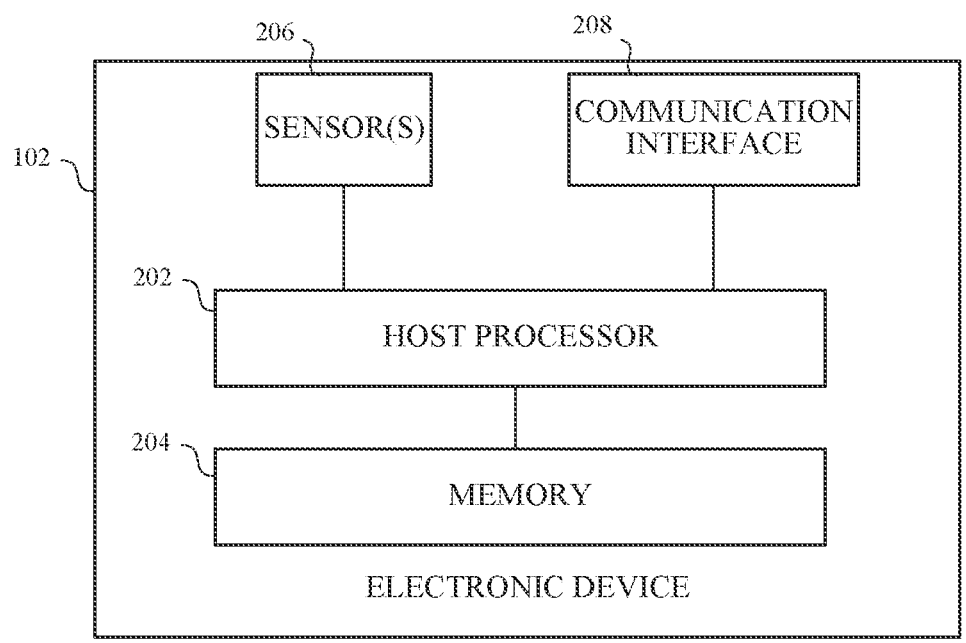
FIG. 2 depicts an example electronic device that may implement the subject methods and systems, in accordance with one or more implementations.

FIG. 2 depicts an example electronic device 102 that may implement the subject methods and systems, in accordance with one or more implementations. For explanatory purposes, FIG. 2 is primarily described herein with reference to the electronic device 102 of FIG. 1. However, this is merely illustrative, and features of the electronic device of FIG. 2 may be implemented in any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 102 may include one or more of a host processor 202, a memory 204, one or more sensor(s) 206, and/or a communication interface 208. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). In one or more implementations, the memory 204 may store user location data, images (e.g., photos, digital stickers, and the like), content items (e.g., photos, messages, locations, contacts, music, videos, or any other digital asset), journal entries (e.g., user-generated notes), account data (e.g., login information, user IDs, and the like), and any other data generated in the course of performing the processes described herein.

The sensor(s) 206 may include one or more motion sensors, biometric sensors, location sensors, and the like. The motion sensors may generate motion data based on the motion of the user (e.g., when holding the electronic device 102). The motion data may be used to determine, for example, the number of steps taken, distance traveled, and the like. The biometric sensors may generate biometric data based on, for example, the contact of the sensor with the user. For example, biometric data may include heart rate, respiratory rate, and the like.

The location sensors may generate location data based on a satellite signal, network signal, and the like. The location data may be used to determine, for example, the distance traveled, the proximity to locations of interest (e.g., home or work), and the like. The location sensors may provide for one or more of GNSS positioning (e.g., via a GNSS receiver configured to receive signals from GNSS satellites), wireless access point positioning (e.g., via a wireless network receiver configured to receive signals from wireless access points), cellular phone signal positioning, Bluetooth signal positioning (e.g., via a Bluetooth receiver), image recognition positioning (e.g., via an image sensor) and/or an INS (e.g., via motion sensors such as an accelerometer and/or gyroscope).

The communication interface 208 may include suitable logic, circuitry, and/or code that enables wired or wireless communication, such as between the electronic device 102 and the server 108. The communication interface 208 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the sensor(s) 206, the communication interface 208, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
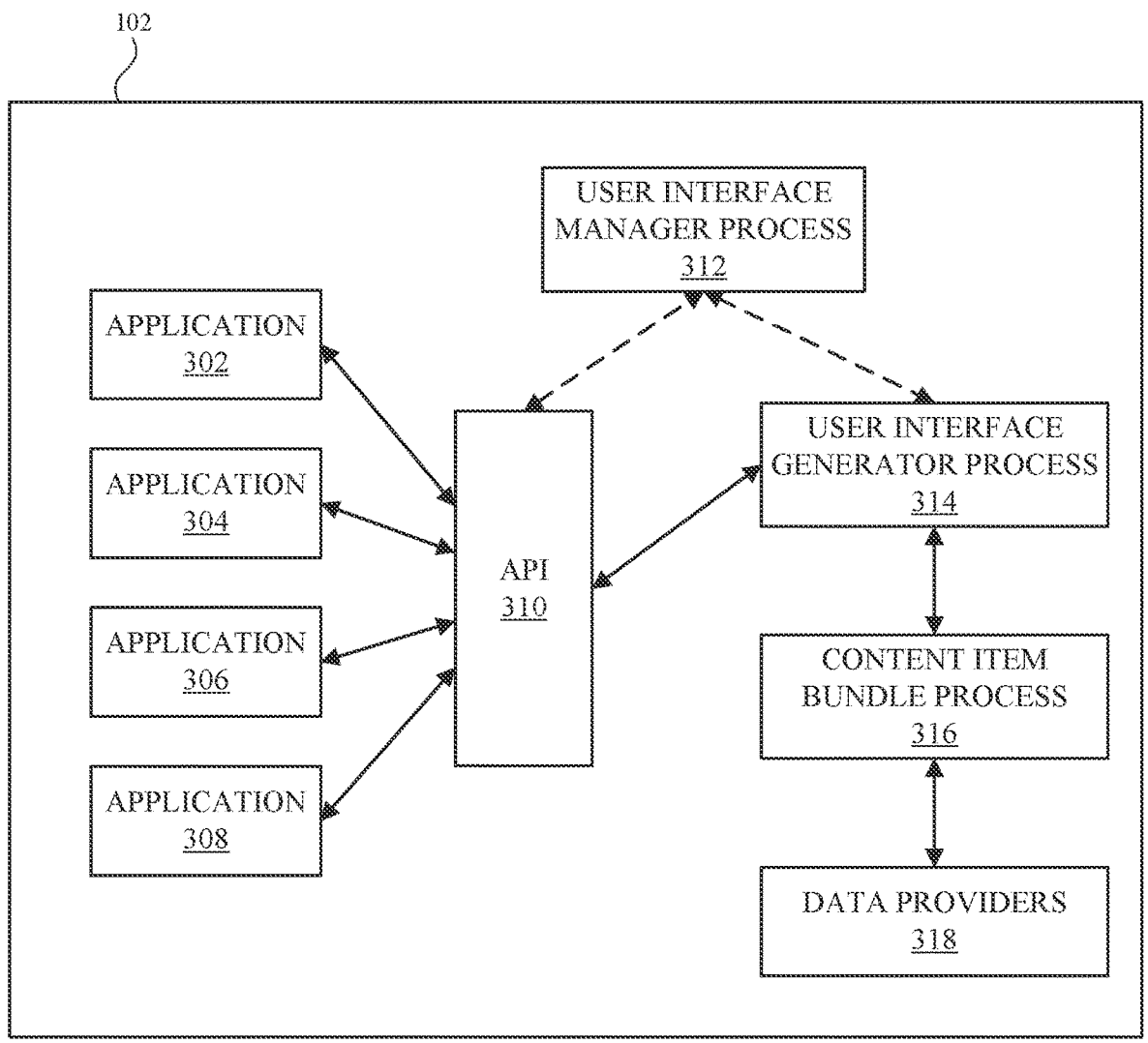
FIG. 3 depicts a configuration of an electronic device for presenting content item bundles, in accordance with one or more implementations.

FIG. 3 depicts a configuration of an electronic device 102 for presenting content item bundles, in accordance with one or more implementations. For explanatory purposes, FIG. 3 is primarily described herein with reference to the electronic device 102 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may execute one or more applications 302-308. An application may be and/or may include one or more software programs that run on the electronic device 102. For example, a journaling application may run on the electronic device 102 and allow the user to keep a diary or log of their activities, thoughts, and experiences. An application 302-308 may render one or more user interfaces for interfacing with the user. In some embodiments, exemplary user interfaces for interacting with the user can include notification user interfaces generated by the application. An application 302-308 may interact with one or more other software components of the electronic device 102 including the user interface generator process 314, and indirectly with the content item bundle process 316 and the data providers 318.

The electronic device 102 may include one or more data providers 318. Data providers 318 include one or more sources of information on the electronic device 102 that generate content items, which may be used to create content item bundles. These could be various applications or services on the electronic device 102, each of which may, in one or more implementations, provide different types of content items. For example, podcast applications could provide content items about recently listened to episodes, activity applications could provide content items about the user's recent workouts or other health and fitness data, messaging applications could provide content items about recently messaged contacts, or any other application or service on the electronic device 102 that generates content items could serve as a data provider 318. In some examples, one or more of the applications 302-308 may also be a data provider 318.

The electronic device 102 may also include a content item bundle process 316. The content item bundle process 316 may be a system process (e.g., a daemon, a background process, and the like) that can communicate with one or more data providers 318 (e.g., to fetch content item bundles). In some examples, instead of storing the actual data, the content item bundle process 316 stores identifiers or pointers to content items of a data provider 318. This way, the electronic device 102 maintains privacy by not replicating content items but still being able to access the content items when needed. In some examples, if the content item is deleted from the original source, these pointers automatically become invalidated, providing an additional layer of security. The content item bundle process 316 may compile the content items to generate one or more content item bundles, where each bundle may include the content items enriched with additional labels, prompts, text, metadata, and the like. In one or more implementations, the content item bundles may serve as proposed journaling suggestions in a journaling application. The content item bundle process 316 may prioritize (e.g., rank) and/or sort the content items based on criteria such as user interest, engagement history, timing, location, and the like, to group similar content together into content item bundles to highlight relevant content. In some examples, the content item bundle process 316 may operate on a schedule, refreshing its content periodically (e.g., every 24 hours).

The electronic device 102 may also include a user interface generator process 314. The user interface generator process 314 may be a system process that manages the interactions with the user with respect to the content item bundles, allowing the user to browse and/or select which content item bundles they would like to provide to an application 302-308. The user interface generator process 314 may render a user interface for displaying content item bundles to the user such that the applications 302-308 cannot access the content item bundles until one is selected by the user. When a content item bundle is selected by the user for providing to an application 302-308, the user interface generator process 314 may retrieve the actual content item corresponding to the user's selection from the content item bundle process 316 and provide the content item to the appropriate application 302-308.

In some examples, the user interface generator process 314 may render a user interface in conjunction with the user interface of one or more applications 302-308 coordinated by a user interface manager process 312. The user interface manager process 312 may coordinate the rendering of user interfaces between the user interface generator process 314 and the one or more applications 302-308, for example, to make them appear as if they were part of a unified user interface. In some examples, the user interface rendered by the user interface generator process 314 may be rendered overlaying at least part of an application 302-308, inside at least part of an application 302-308, alongside an application 302-308, and the like.

In some examples, the electronic device 102 may also include application programming interfaces (APIs) and/or service provider interfaces (SPIs) (API 310), which may include a set of methods and/or functions that the applications 302-308 may use to interact with the user interface generator process 314. For example, the application 302 may call a method defined in the API 310 to request content items for display from the user interface generator process 314. Similarly, when the user selects a content item bundle, the user interface generator process 314 may call a method defined in the API 310 to pass the application 302 the selected content item bundle.

Figure 4:
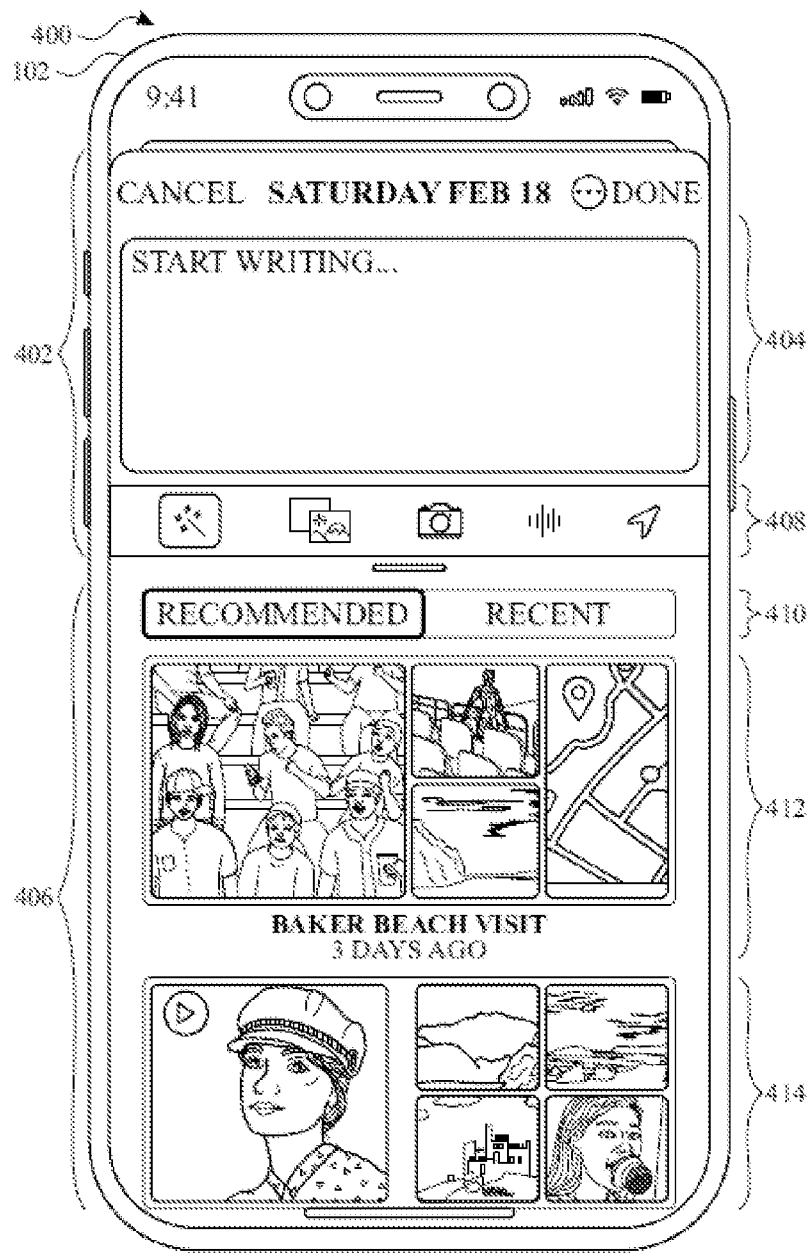
FIG. 4 depicts an electronic device displaying a user interface for creating a journal entry, in accordance with one or more implementations.

FIG. 4 depicts an electronic device 102 displaying user interfaces for creating a journal entry in a journaling application 400, in accordance with one or more implementations. For explanatory purposes, FIG. 4 is primarily described herein with reference to the electronic device 102 of FIG. 1. Not all of the depicted components may be used in all implementations, however, and one or more implementations may include additional or different components than those shown in the figure. FIGS. 4-7 are discussed with respect to the journaling application 400. However, it should be understood that the subject technology is not limited to journaling applications and may be applied to other applications to which system process(es) of the electronic device 102 may provide data (e.g., content items and content item bundles).

The electronic device 102 may display multiple user interfaces coordinated by a user interface manager process 312. The first user interface 402 may be rendered by the journaling application 400 on an electronic display of the electronic device 102. The first user interface 402 depicts a journal entry interface including a text field 404 to input text and one or more journal options 408 for adding attachments (e.g., content items).

The second user interface 406 may be rendered by a system process, such as the user interface generator process 314. The second user interface 406 may be a "suggestion sheet," which, as shown in FIG. 4, is presented on top of the journaling application 400. The second user interface 406 may display (e.g., on the electronic display of the electronic device 102) the content item bundles 412, 414 generated and provided by the content item bundle process 316 from one or more data providers 318. The user can review the displayed content item bundles 412, 414 and select one or more content item bundles and/or one or more contents items thereof, which may then be provided (e.g., transferred) to the journaling application 400 from the content item bundle process 316 by the user interface generator process 314 via one or more API 310 calls.

Figure 5:
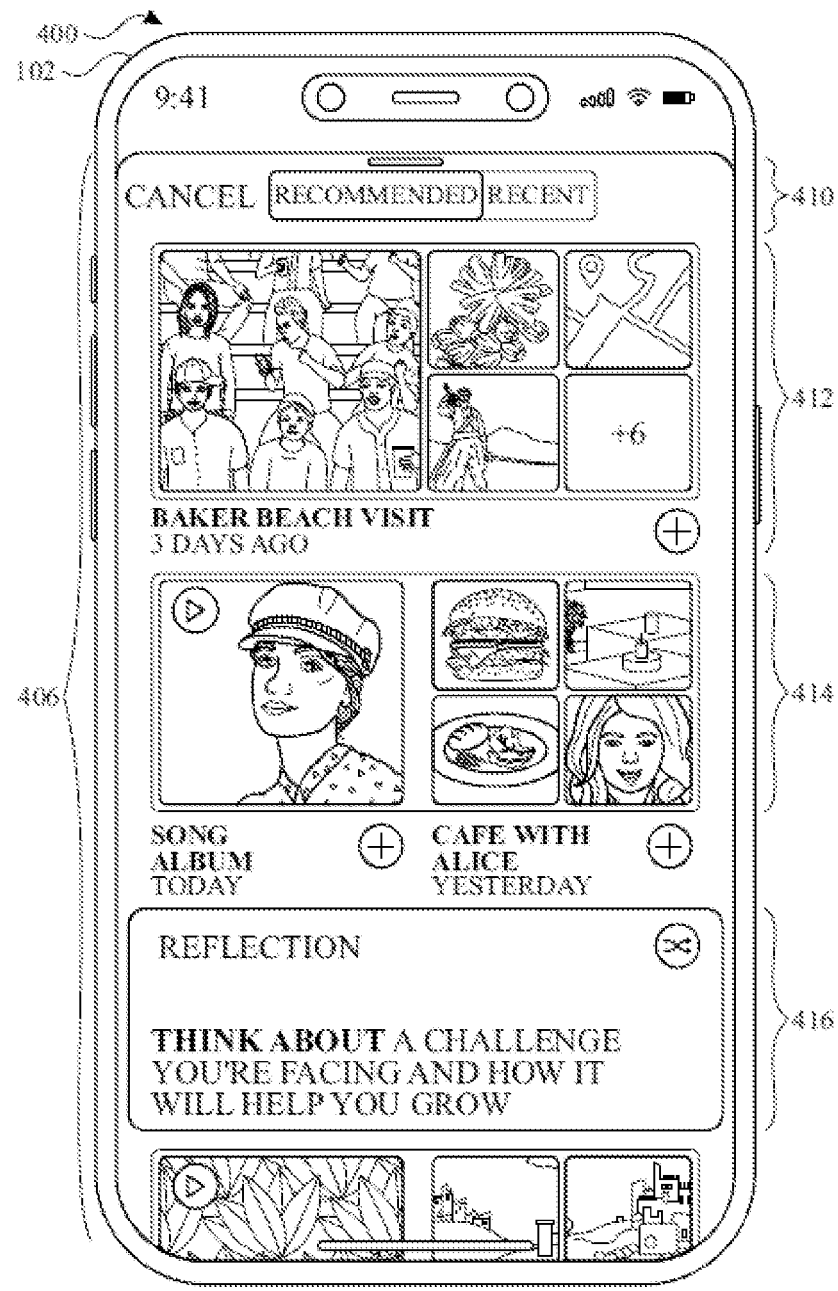
FIG. 5 depicts an electronic device displaying a set of content item bundles, in accordance with one or more implementations.

FIG. 5 depicts an electronic device 102 displaying a set of content item bundles, in accordance with one or more implementations. For explanatory purposes, FIG. 5 is primarily described herein with reference to the electronic device 102 of FIG. 1. Not all of the depicted components may be used in all implementations, however, and one or more implementations may include additional or different components than those shown in the figure.

In one or more implementations, the first user interface 402 and the second user interface 406 may be resized. The user interface manager process 312 may facilitate the resizing of the separate user interfaces such that they feel like a single user interface to the user. For example, from the user interfaces as displayed in FIG. 4, the second user interface 406 may be expanded such that it overlaps the first user interface 402, covering the full display of the electronic device 102 to show more options for the user to select. As another example, the second user interface 406 may be expanded to the point of covering the full display of the electronic device 102 while the first user interface 402 is reduced to the point of not being visible.

Expanding the second user interface 406 may allow the user to view more content item bundles 412, 414 and other content such as a journal prompt 416. The second user interface 406 may include one or more options 410 for how the content item bundles are presented. The options 410 may include an option to sort the content item bundles (and/or any other content) by its relevance to the user. For example, if the current date is the anniversary of an important event, such as a wedding, content item bundles that relate to the important event may be prioritized and presented first. The options 410 may also include an option to sort the content item bundles (and/or any other content) by recency. The options 410 may also include an option to sort by the type of content presented. For example, the user may sort such that the journal prompt 416 is presented before the content item bundles 412, 414. In some examples, the options 410 may include filters to filter out content item bundles or contents items thereof. For example, the user may not want to be presented with any music and thus may filter out music content items from the second user interface 406 and/or one or more content item bundles 412, 414.

Figure 6:
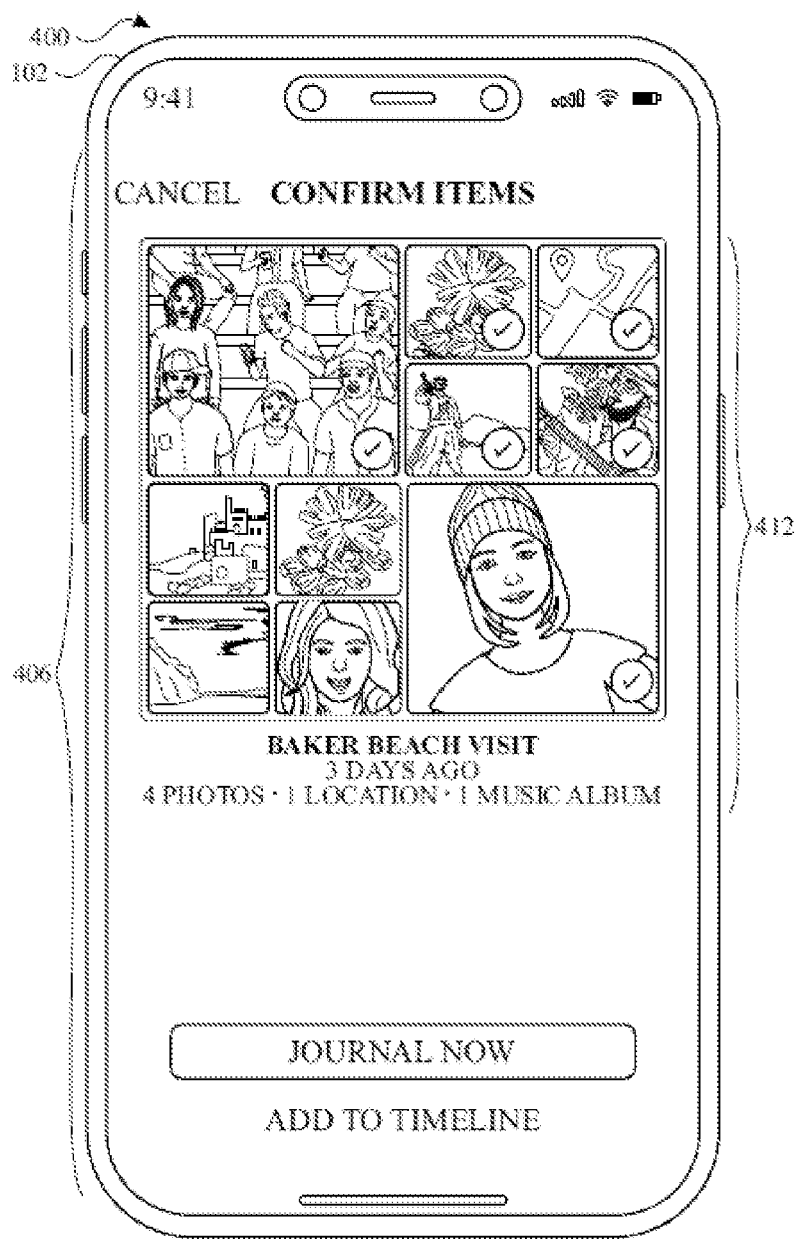
FIG. 6 depicts an electronic device displaying content items of a content item bundle, in accordance with one or more implementations.

FIG. 6 depicts an electronic device 102 displaying content items of a content item bundle, in accordance with one or more implementations. For explanatory purposes, FIG. 6 is primarily described herein with reference to the electronic device 102 of FIG. 1. Not all of the depicted components may be used in all implementations, however, and one or more implementations may include additional or different components than those shown in the figure.

Within the second user interface 406, the user may select a content item bundle 412 and select one or more content items thereof. Content items may include photos, videos, music, contacts, maps, and any other digital asset. The content item bundles may be suggestions of groups of similar content items that may be of interest to the user. For example, as shown in FIG. 6, the content item bundle 412 includes multiple photos and a location related to a previous beach visit. The second user interface 406 may include one or more interface elements (e.g., checkboxes) allowing the user to select the content item bundle 412 or portions thereof. With the selected content items, the user may proceed to create a journal entry.

Figure 7:
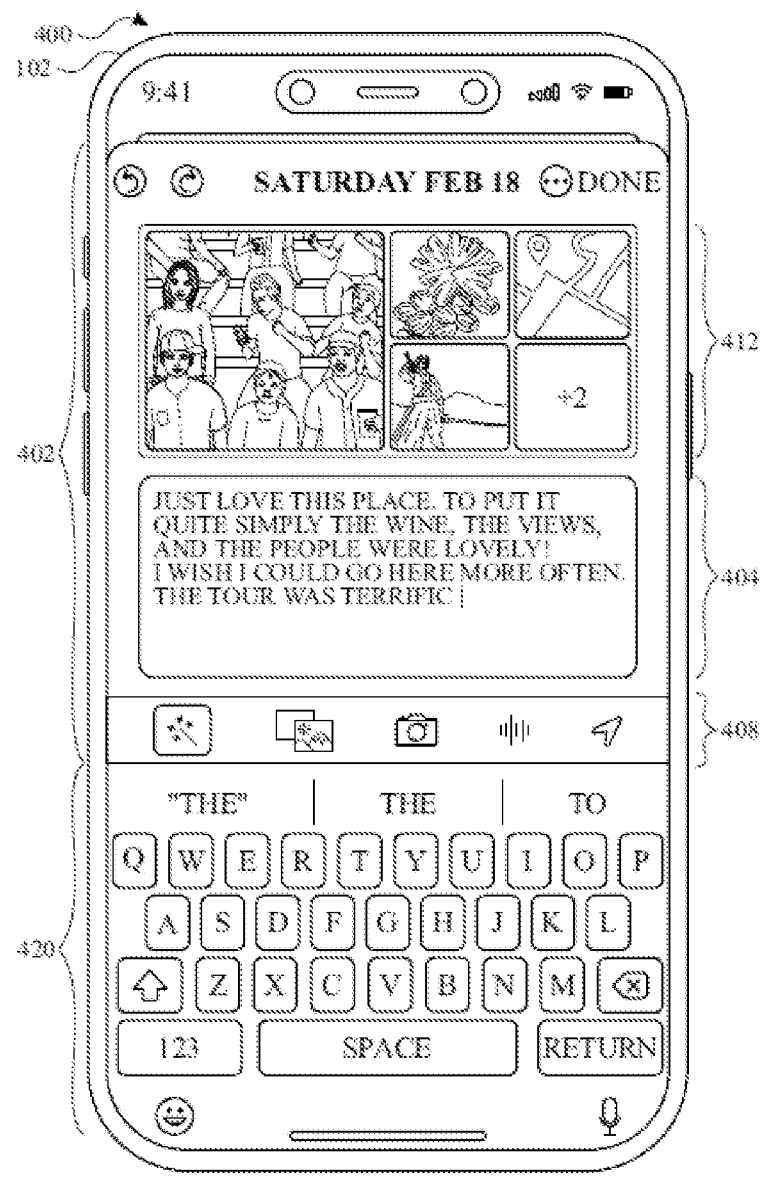
FIG. 7 depicts a user attaching content items to a journal entry, in accordance with one or more implementations.

FIG. 7 depicts a user attaching content items to a journal entry, in accordance with one or more implementations. For explanatory purposes, FIG. 7 is primarily described herein with reference to the electronic device 102 of FIG. 1. Not all of the depicted components may be used in all implementations, however, and one or more implementations may include additional or different components than those shown in the figure.

As part of creating a journal entry, the journaling application 400 may acquire, receive, capture, or otherwise obtain text input from the user through an input device interface, including a physical keyboard, a virtual keyboard 420 displayed on a touchscreen, voice recognition system, or other input modalities. The user may interact with the text field 404, for example, by manually typing or dictating text, selecting from suggested options, and/or utilizing voice commands.

After the user selects one or more content item bundles and/or individual content items, the journaling application 400 may also receive data associated with the selected content items. The user interface generator process 314 may provide the selected content items to the content item bundle process 316. The content item bundle process 316 may then obtain (e.g., fetch, access, retrieve, receive, download, and/or the like) the data of the selected content items 422 from the corresponding data providers 318 and provide it to the application (e.g., via the user interface generator process 314), which may be associated with (e.g., attached to) the journal entry.

Figure 8:
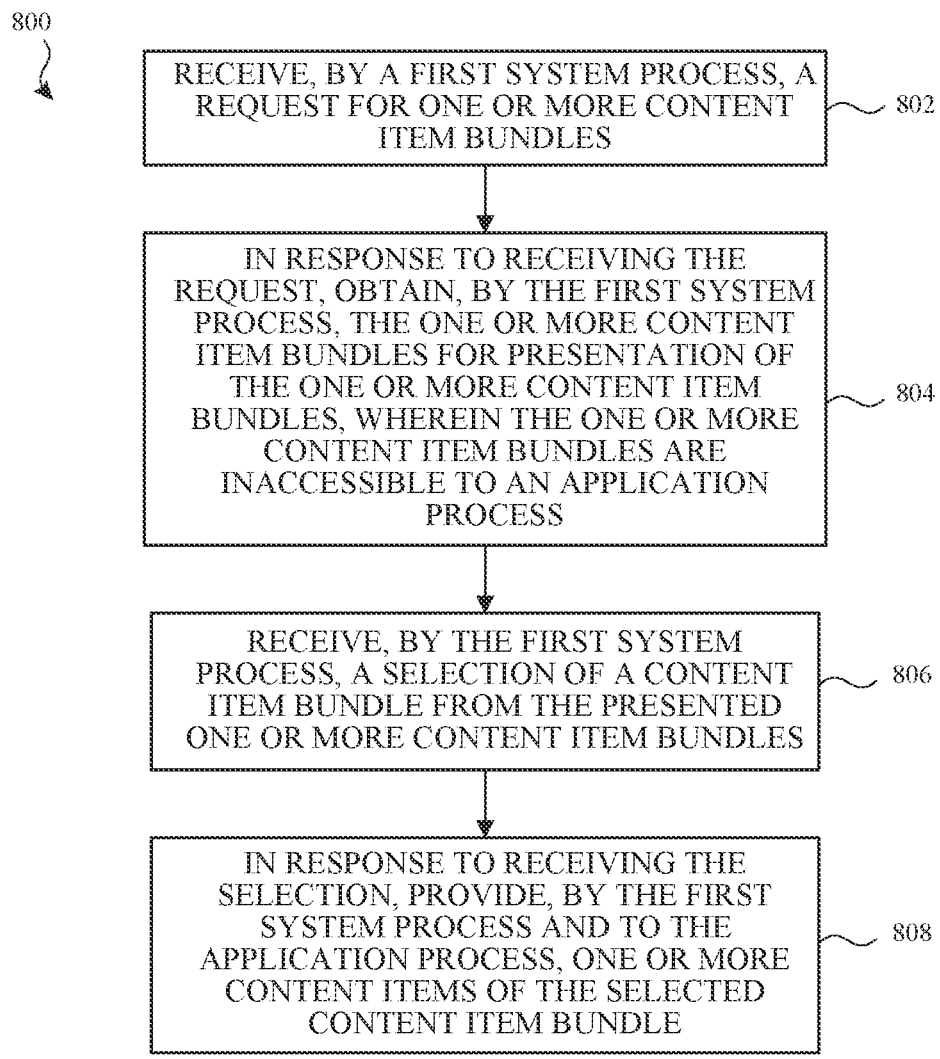
FIG. 8 depicts a flow diagram of an example process for providing content item bundles, in accordance with one or more implementations.

FIG. 8 depicts a flow diagram of an example process for providing content item bundles, in accordance with one or more implementations. For explanatory purposes, the process 800 is primarily described herein with reference to the electronic device 102 and the server 108 of FIG. 1. However, the process 800 is not limited to the electronic device 102 or the server 108, and one or more blocks of the process 800 may be performed by one or more other components of the server 108, and/or by other suitable devices. Further, for explanatory purposes, the blocks of the process 800 are described herein as occurring sequentially or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a first system process (e.g., the user interface generator process 314) of the electronic device (e.g., the electronic device 102) receives a request for one or more content item bundles (e.g., the content item bundles 412, 414). In some embodiments, the first system process is a process of an operating system. The content item bundles may refer to sets of content items (e.g., data or digital assets from data providers 318), which have been aggregated, processed, packaged, or the like (e.g., by a content item bundle process 316) based on criteria including common events, times, locations, or any other metadata. The content item bundles may include content items such as text, images, music, geographic locations, contacts, and other data. The content item bundles may also or instead include representations of the content items, such as pointers to the content items (e.g., locations in memory, URLs, and the like), derivations of the content items (e.g., thumbnails), and the like.

The request may be an automated or user-triggered request (e.g., demand, query, and the like) for one or more content item bundles. The request for the one or more content item bundles may be from an application process of an application (e.g., the journaling application 400) running on the electronic device, such as an API call. The application may be any program or suite of programs that are designed to perform tasks via one or more processes running on the electronic device. The application process does not directly access or retrieve the content item bundles or the content items but rather issues a request to the first system process for the content item bundles and the content items. The application process may render a user interface that includes one or more display elements for initiating a request for one or more content items bundles (e.g., options 408).

At block 804, in response to receiving the request, the first system process obtains one or more content item bundles. Like the application process, the first system process may also not directly access or retrieve the content item bundles or the associated content items. When the first system process receives the request, the first system process may request the second system process (e.g., content item bundle process 316) to retrieve (e.g., gather, compile, collect, access, and the like) the content item bundles and provide them to the first system process. In some embodiments the second system process is a process of an operating system (e.g., the same operating system as the first process).

The first system process may render a user interface to present the one or more content item bundles to the user. The user interface of the first system process may be displayed alongside the user interface of the application process. The user interfaces of the first system process and the application process may be incorporated into a hybrid user interface by another system process (e.g., user interface manager process 312). The user interface of the first system process may present the one or more content item bundles such that they are inaccessible to an application process. The user interface of the first system process may include one or more options (e.g., options 410) for sorting, filtering, or otherwise manipulating the one or more content item bundles.

For example, after generating the content item bundles, the first system process and/or the second system process may apply a ranking algorithm to the content item bundles, which assesses the relevance or importance of each content item bundle based on factors such as user behavior, interaction history, the popularity of similar suggestions among a broader anonymized segment of a population, time of day, important events (e.g., anniversaries, weddings, and the like), and the like. The result may be the first system process presenting the content item bundles in order of ranking. Additionally or alternatively, the first system process and/or the second system process may sort the content item bundles in ascending or descending chronological order.

At block 806, the first system process receives a selection of a content item bundle from the presented one or more content item bundles. The selection may be made by the user, who interacts with the user interface rendered by the first system process (e.g., the second user interface 406), such as by clicking, tapping, or via a voice command. In some examples, the user may remove content items from and/or add content items to a content item bundle when making a selection. Receiving the selection may cause the first system process to obtain the content items associated with the selected content item bundle (e.g., via the second system process).

At block 808, in response to receiving the selection, the first system process sends, transfers, uploads, or otherwise provides to the application process one or more content items of the selected content item bundle. Because the content item bundles may only include locations (e.g., links, URLs, addresses, and the like) of the content items, providing the one or more content items may include extracting (e.g., deriving, accessing, obtaining, and the like) the content item locations from the content item bundle and obtaining (e.g., accessing, downloading, retrieving, receiving, and the like) the corresponding content items (e.g., from one or more data providers 318).

Figure 9:
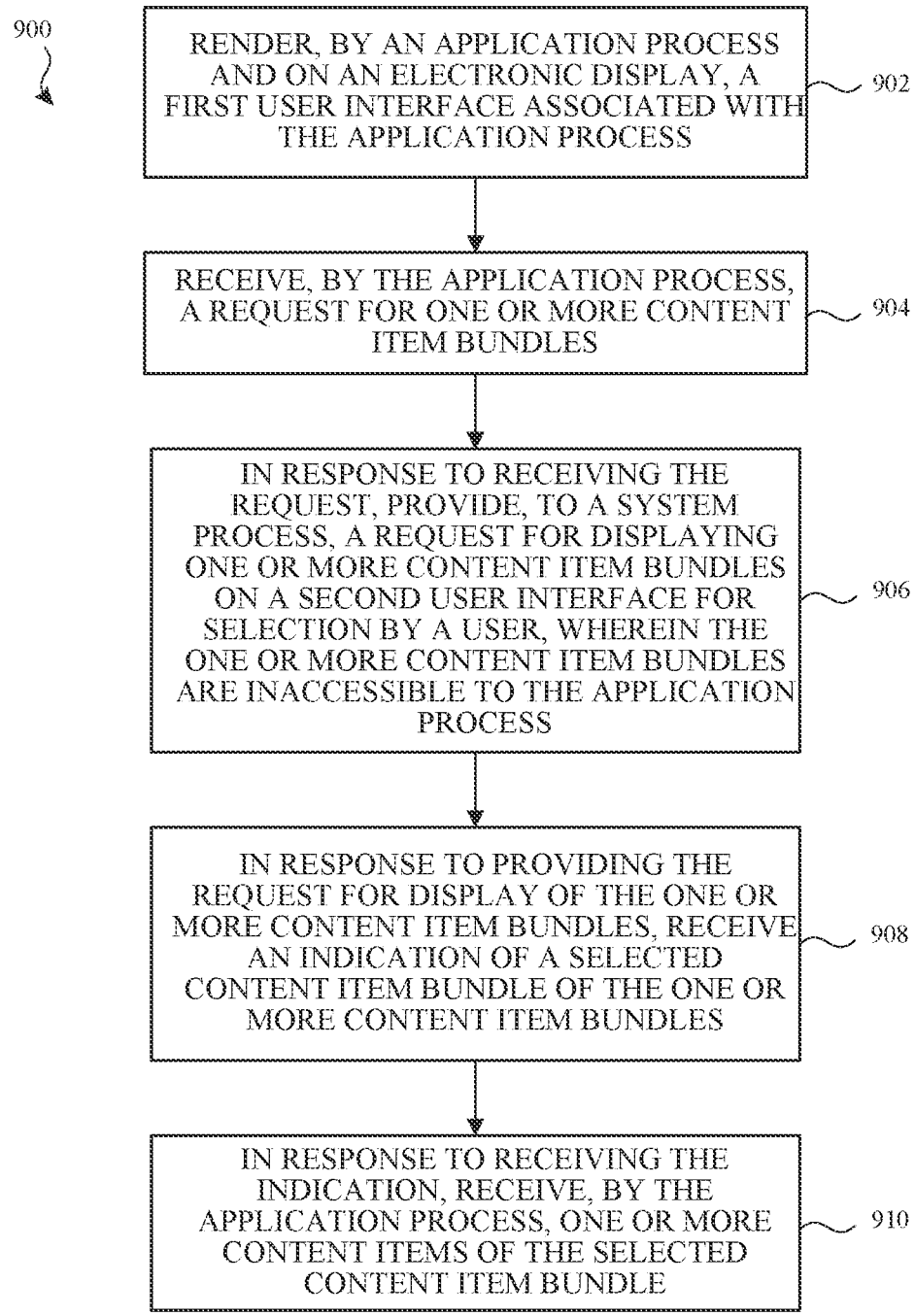
FIG. 9 depicts a flow diagram of example process for receiving content item bundles, in accordance with one or more implementations.

FIG. 9 depicts a flow diagram of example process for receiving content item bundles, in accordance with one or more implementations. For explanatory purposes, the process 900 is primarily described herein with reference to the electronic device 102 and the server 108 of FIG. 1. However, the process 900 is not limited to the electronic device 102 or the server 108, and one or more blocks of the process 900 may be performed by one or more other components of the server 108, and/or by other suitable devices. Further, for explanatory purposes, the blocks of the process 900 are described herein as occurring sequentially or linearly. However, multiple blocks of the process 900 may occur in parallel. In addition, the blocks of the process 900 need not be performed in the order shown and/or one or more blocks of the process 900 need not be performed and/or can be replaced by other operations.

At block 902, an application process (e.g., an application 302) may render a first user interface (e.g., the first user interface 402). The first user interface may include various interface elements such as buttons, menus, forms, and text boxes, which the user can manipulate or interact with to control the application process. The first user interface may include one or more display elements for initiating a request for one or more content items (e.g., options 408).

At block 904, the application process may receive a request for one or more content item bundles (e.g., content item bundles 412, 414). The request may be an automated or user-triggered request (e.g., demand, query, and the like) for one or more content item bundles (e.g., one or more content items). The request for the one or more content item bundles may be from a user interaction with a display element of the first user interface.

At block 906, in response to receiving the request, the application process may provide to a first system process (e.g., the user interface generator process 314) a request for displaying one or more content item bundles on a second user interface (e.g., the second user interface 406) for selection by the user.

The application may be any program or suite of programs that are designed to perform tasks via one or more processes running on the electronic device. The application process does not directly access or retrieve the content item bundles but rather issues a request to the system process for the content item bundles.

Like the application process, the first system process may also not directly access or retrieve the content item bundles. When the first system process receives the request, the first system process may send a request to the second system process (e.g., content item bundle process 316) to retrieve (e.g., gather, compile, collect, access, and the like) the content item bundles and provide them to the first system process.

The first system process may render a second user interface (e.g., the second user interface 406) to present the one or more content item bundles to the user. The user interface of the first system process may be displayed alongside the user interface of the application process. The user interfaces of the first system process and the application process may be incorporated into a hybrid user interface by another system process (e.g., user interface manager process 312). The user interface of the first system process may present the one or more content item bundles such that they are inaccessible to an application process. The user interface of the first system process may include one or more options (e.g., options 410) for sorting, filtering, or otherwise manipulating the one or more content item bundles.

For example, after generating the content item bundles, the first system process and/or the second system process may apply a ranking algorithm to the content item bundles, which assesses the relevance or importance of each content item bundle based on factors such as user behavior, interaction history, the popularity of similar suggestions among a broader anonymized segment of a population, time of day, important events (e.g., anniversaries, weddings, and the like), and the like. The result may be the first system process presenting the content item bundles in order of ranking. Additionally or alternatively, the first system process and/or the second system process may sort the content item bundles in ascending or descending chronological order.

At block 908, in response to providing the request for displaying the one or more content item bundles, the application process may receive an indication of a selected content item bundle. The selection may be made by the user, who interacts with the user interface rendered by the first system process, such as by clicking, tapping, or via a voice command. In some examples, the user may remove content items from and/or add content items to (e.g., from another content item bundle) a content item bundle when making a selection. When the selection is made, the first system process may provide a message, signal, metadata, or any other indication of the selected content item bundle.

The first system process may provide an indication of the selection to the application process, for instance, via a callback function in a software library, an API call (e.g., API 310), and the like. Receiving the indication of the selection may cause the application process to allocate memory, modify user interface elements (e.g., render a user interface element for displaying the content item bundle), or otherwise prepare for receiving the one or more content items of the selected content item bundle.

At block 910, in response to receive the indication, the application process may receive one or more content items of the selected content item bundle. After the user makes a selection, the first system process sends, transfers, uploads, or otherwise provides to the application process one or more content items of the selected content item bundle. Because the content item bundles may only include locations (e.g., links, URLs, address, and the like) of the content items, providing the one or more content items may include extracting (e.g., deriving, accessing, obtaining, and the like) the content item locations from the content item bundle and obtaining (e.g., accessing, downloading, retrieving, receiving, and the like) the corresponding content items (e.g., from one or more data providers 318).

In response to receiving the one or more content items (e.g., the selected content items 422) of the selected content item bundle, the application process may display at least one content item of the one or more content items on the application user interface (e.g., the first user interface 402).

In some examples, the application process may also receive one or more annotations associated with the one or more content items. For example, the user may input text (e.g., in a text field 404) that describes one or more aspects of the one or more content items. The application process may store the one or more annotations and/or the one or more content items in a data structure (e.g., a database, library, and the like) associated with the application (e.g., in memory 204).

Figure 10:
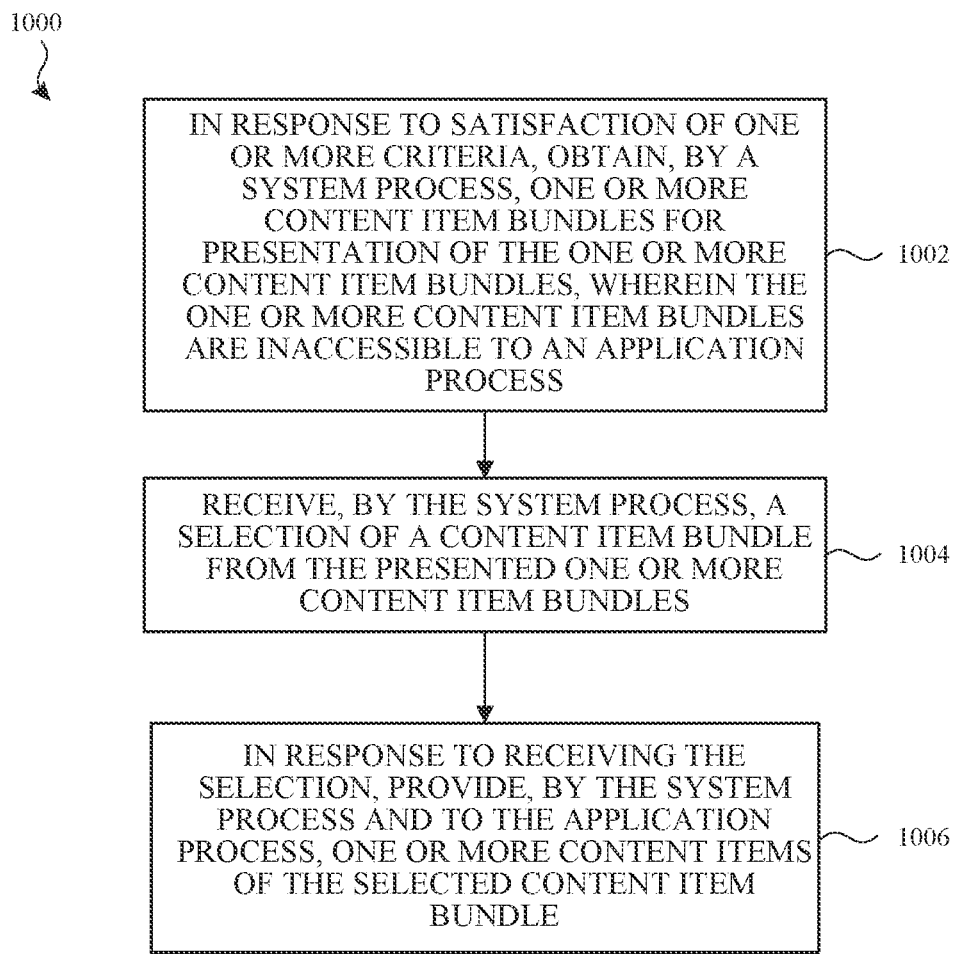
FIG. 10 depicts a flow diagram of another example process for providing content item bundles, in accordance with one or more implementations.

FIG. 10 depicts a flow diagram of another example process 1000 for providing content item bundles, in accordance with one or more implementations. For explanatory purposes, the process 1000 is primarily described herein with reference to the electronic device 102 and the server 108 of FIG. 1. However, the process 1000 is not limited to the electronic device 102 or the server 108, and one or more blocks of the process 1000 may be performed by one or more other components of the server 108, and/or by other suitable devices. Further, for explanatory purposes, the blocks of the process 1000 are described herein as occurring sequentially or linearly. However, multiple blocks of the process 1000 may occur in parallel. In addition, the blocks of the process 1000 need not be performed in the order shown and/or one or more blocks of the process 1000 need not be performed and/or can be replaced by other operations.

At block 1002, the system process (e.g., the UI generator process 314) acquires, receives, captures, or otherwise obtains one or more content item bundles for presentation (e.g., from the content item bundle process 316). The one or more content item bundles are inaccessible to an application process (e.g., a process associated with application 302-308).

Obtaining the one or more content item bundles may be in response to satisfaction of one or more criteria, such as receiving a determination that a notification criteria has been satisfied. Rather than rendering a system user interface (e.g., the second user interface 406) alongside an application user interface (e.g., the first user interface 402) for selecting one or more content item bundles, the application process may include one or more notification criteria that, when one or more are satisfied, cause the application process, or a system process on behalf of the application process, to render a notification (e.g., pop-up notification, dropdown notification, and the like) on the electronic device (e.g., the electronic device 102). When the user interacts with (e.g., taps) the notification, for example, the system process may render a system user interface presenting one or more content item bundles to the user for selection.

In some examples, notification criteria may include a scheduled notification criteria that has been preconfigured for the application process. For example, an application process may include a regular schedule (e.g., every morning) for generating a notification that presents a user with one or more content item bundles.

In some examples, determining that a notification criteria has been satisfied may be based on the application usage history of the user. The application process may generate (e.g., gather over time) a usage history including times, places, nearby people, and any other circumstances surrounding when the application associated with the application process was used (e.g., opened, interacted with, and the like). When the user's current situation matches a threshold number of data points from the usage history, the notification criteria may be satisfied thereby causing the application process to render a notification on the electronic device.

In some examples, the content item bundles may include a default set of content item bundles and/or a default prompt soliciting user input (e.g., a journal entry), which may be associated with future content item bundles. For example, a user a may write a journal entry and later select one or more content item bundles to attach to the journal entry.

At block 1004, the system process receives a selection of a content item bundle presented to the user at block 1002. The selection may be made by the user, who interacts with the user interface rendered by the system process (e.g., in a notification), such as by clicking, tapping, or via a voice command. In some examples, the user may remove content items from and/or add content items to a content item bundle when making a selection.

At block 1006, in response to receiving the selection, the system process sends, transfers, uploads, or otherwise provides to the application process one or more content items of the selected content item bundle. Because the content item bundles may only include locations (e.g., links, URLs, addresses, and the like) of the content items, providing the one or more content items may include extracting (e.g., deriving, accessing, obtaining, and the like) the content item locations from the content item bundle and obtaining (e.g., accessing, downloading, retrieving, receiving, and the like) the corresponding content items (e.g., from one or more data providers 318).

In some examples, providing the one or more content items may including presenting a prompt to authorize the system process to provide the one or more content items bundles. The user may provide consent to provide the one or more content items via the prompt. If the user consents, the system process may provide the one or more content items to the application process.

Figure 11:
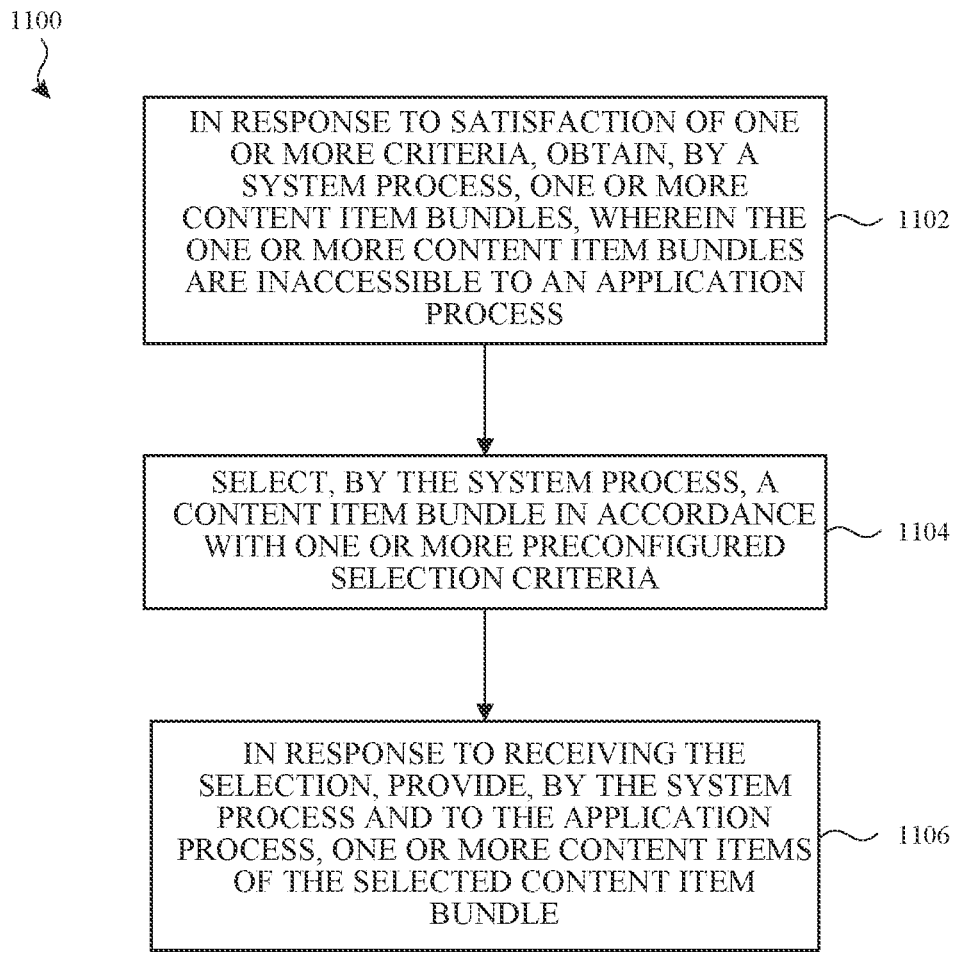
FIG. 11 depicts a flow diagram of another example process for providing content item bundles, in accordance with one or more implementations.

FIG. 11 depicts a flow diagram of another example process 1100 for providing content item bundles, in accordance with one or more implementations. For explanatory purposes, the process 1100 is primarily described herein with reference to the electronic device 102 and the server 108 of FIG. 1. However, the process 1100 is not limited to the electronic device 102 or the server 108, and one or more blocks of the process 1100 may be performed by one or more other components of the server 108, and/or by other suitable devices. Further, for explanatory purposes, the blocks of the process 1100 are described herein as occurring sequentially or linearly. However, multiple blocks of the process 1100 may occur in parallel. In addition, the blocks of the process 1100 need not be performed in the order shown and/or one or more blocks of the process 1100 need not be performed and/or can be replaced by other operations.

At block 1102, the system process (e.g., the UI generator process 314) acquires, receives, captures, or otherwise obtains one or more content item bundles (e.g., from the content item bundle process 316). The one or more content item bundles are inaccessible to an application process (e.g., a process associated with application 302-308). Obtaining the one or more content item bundles may be in response to satisfaction of one or more criteria, including preconfigured times, places, actions, nearby people, and any other circumstances.

At block 1104, the system process receives a selection of a content item bundle obtained at block 1102. The selection may be made by the system process, preconfigured by the user to select one or more content item bundles, or content items thereof, based on criteria that the system process received from the user via a set up user interface. For example, when the user is setting up the system process to generate content item bundles, the user may provide an indication that particular types of content item bundles and/or content items (e.g., music) may be automatically (e.g., without being first presented to the user) provided to application processes by the system process when requested by the application process.

At block 1106, in response to receiving the selection, the system process sends, transfers, uploads, or otherwise provides to the application process one or more content items of the selected content item bundle. Because the content item bundles may only include locations (e.g., links, URLs, addresses, and the like) of the content items, providing the one or more content items may include extracting (e.g., deriving, accessing, obtaining, and the like) the content item locations from the content item bundle and obtaining (e.g., accessing, downloading, retrieving, receiving, and the like) the corresponding content items (e.g., from one or more data providers 318).

Figure 12:
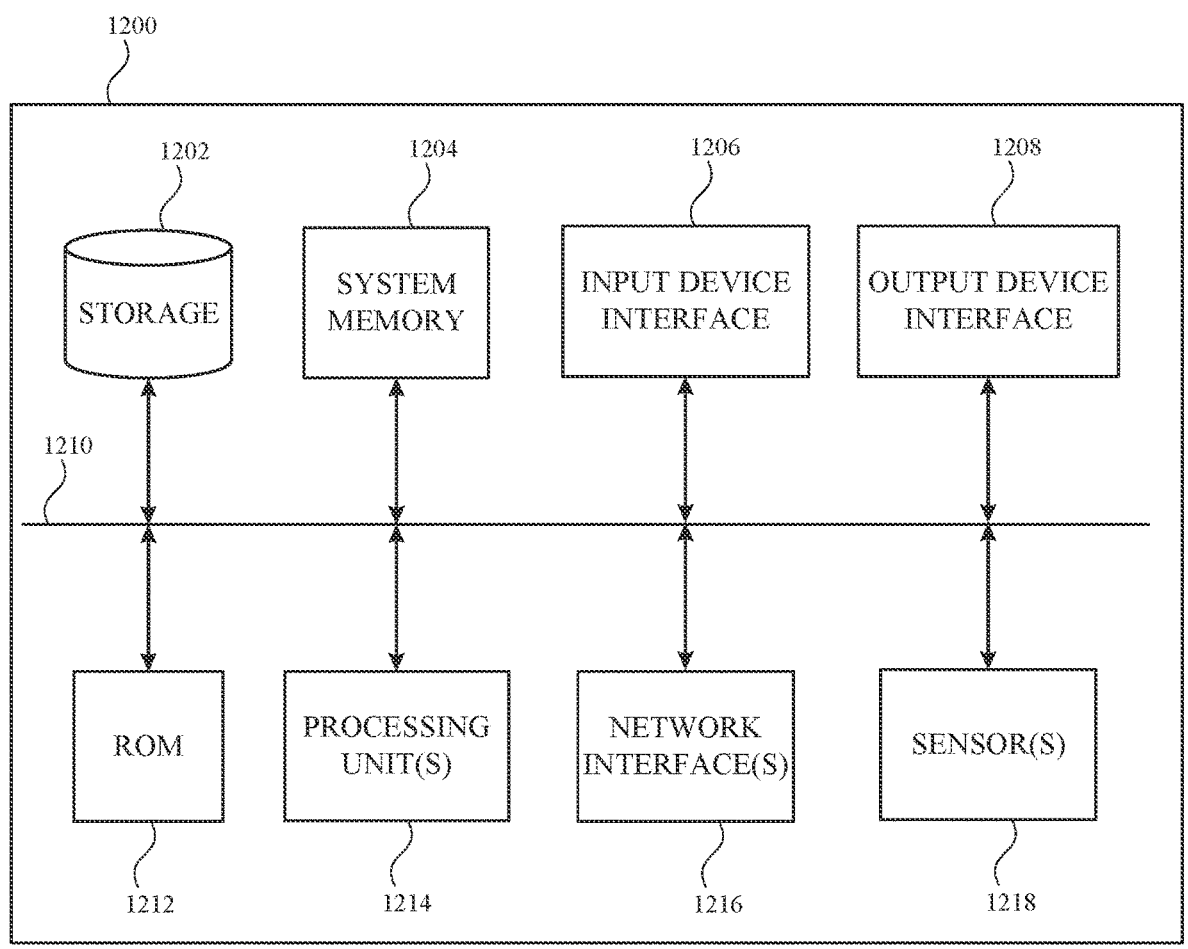
FIG. 12 depicts an example electronic system with which aspects of the present disclosure may be implemented, in accordance with one or more implementations.

FIG. 12 depicts an example electronic system 1200 with which aspects of the present disclosure may be implemented, in accordance with one or more implementations. The electronic system 1200 can be, and/or can be a part of, any electronic device for generating the features and processes described in reference to FIGS. 1-11, including but not limited to a laptop computer, tablet computer, smartphone, and wearable device (e.g., smartwatch, fitness band). The electronic system 1200 may include various types of computer-readable media and interfaces for various other types of computer-readable media. The electronic system 1200 includes one or more processing unit(s) 1214, a persistent storage device 1202, a system memory 1204 (and/or buffer), an input device interface 1206, an output device interface 1208, a bus 1210, a ROM 1212, one or more processing unit(s) 1214, one or more network interface(s) 1216, one or more sensors 1218, and/or subsets and variations thereof.

The bus 1210 collectively represents all system, peripheral, and chipset buses that communicatively connect the numerous internal devices of the electronic system 1200. In one or more implementations, the bus 1210 communicatively connects the one or more processing unit(s) 1214 with the ROM 1212, the system memory 1204, and the persistent storage device 1202. From these various memory units, the one or more processing unit(s) 1214 retrieves instructions to execute and data to process in order to execute the processes of the subject disclosure. The one or more processing unit(s) 1214 can be a single processor or a multi-core processor in different implementations.

The ROM 1212 stores static data and instructions that are needed by the one or more processing unit(s) 1214 and other modules of the electronic system 1200. The persistent storage device 1202, on the other hand, may be a read-and-write memory device. The persistent storage device 1202 may be a non-volatile memory unit that stores instructions and data even when the electronic system 1200 is off. In one or more implementations, a mass-storage device (such as a magnetic or optical disk and its corresponding disk drive) may be used as the persistent storage device 1202.

In one or more implementations, a removable storage device (such as a flash drive) may be used as the persistent storage device 1202. Like the persistent storage device 1202, the system memory 1204 may be a read-and-write memory device. However, unlike the persistent storage device 1202, the system memory 1204 may be a volatile read-and-write memory, such as RAM. The system memory 1204 may store any of the instructions and data that one or more processing unit(s) 1214 may need at runtime. In one or more implementations, the processes of the subject disclosure are stored in the system memory 1204, the persistent storage device 1202, and/or the ROM 1212. From these various memory units, the one or more processing unit(s) 1214 retrieves instructions to execute and data to process in order to execute the processes of one or more implementations.

The bus 1210 also connects to the input device interfaces 1206 and output device interfaces 1208. The input device interface 1206 enables a user to communicate information and select commands to the electronic system 1200. Input devices that may be used with the input device interface 1206 may include, for example, alphanumeric keyboards, touch screens, and pointing devices. The output device interface 1208 may enable the electronic system 1200 to communicate information to users. For example, the output device interface 1208 may provide the display of images generated by electronic system 1200. Output devices that may be used with the output device interface 1208 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 1210 also connects to sensor(s) 1218. The sensor(s) 1218 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an INS (e.g., via motion sensors such as an accelerometer and/or gyroscope). In one or more implementations, the sensor(s) 1218 may be utilized to detect movement, travel, and orientation of the electronic system 1200. For example, the sensor(s) may include an accelerometer, a rate gyroscope, and/or other motion-based sensor(s).

Finally, as shown in FIG. 12, the bus 1210 also couples the electronic system 1200 to one or more networks and/or to one or more network nodes through the one or more network interface(s) 1216. In this manner, the electronic system 1200 can be a part of a network of computers (such as a local area network, a wide area network, an Intranet, or a network of networks, such as the Internet). Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As described above, one aspect of the present technology is the gathering and use of data available from specific and legitimate sources for file sharing. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, personal information data can be used for file sharing. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of file sharing, the present technology can be configured to allow users to select to "opt-in" or "opt-out" of participation in the collection of personal information data during registration for services or anytime thereafter. In addition to providing "opt-in" and "opt-out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A method comprising:
   receiving, by a first system process, a request for one or more content item bundles;
   in response to receiving the request, obtaining, by the first system process, the one or more content item bundles for presentation of the one or more content item bundles, wherein the one or more content item bundles are inaccessible to an application process;
   receiving, by the first system process, a selection of a content item bundle from the presented one or more content item bundles; and
   in response to receiving the selection:
     extracting one or more content item locations from the selected content item bundle,
     obtaining one or more content items from the one or more content item locations, and
     providing, by the first system process and to the application process, the one or more content items of the selected content item bundle.

2. The method of claim 1, wherein the request for the one or more content item bundles is from the application process.

3. The method of claim 1, wherein the one or more content item bundles are obtained by the first system process from a second system process.

4. The method of claim 1, further comprising:
   in response to obtaining the one or more content item bundles, ranking the one or more content item bundles using a ranking algorithm; and
   sorting the one or more content item bundles based on the ranking.

5. The method of claim 1, further comprising:
   in response to obtaining the one or more content item bundles, sorting the one or more content item bundles based on a respective date associated with each content item bundle.

6. The method of claim 1, further comprising:
   rendering, by the application process and on an electronic display, a first user interface; and
   rendering, by the first system process and on the electronic display, a second user interface.

7. The method of claim 6, further comprising, after obtaining the one or more content item bundles, providing the one or more content item bundles for display on the electronic display via the second user interface.

8. The method of claim 6, further comprising:
   rendering, by a third system process and on the electronic display, a third user interface comprising the first user interface and the second user interface.

9. The method of claim 1, wherein the selected content item bundle includes one or more content items that relate to a common event.

10. The method of claim 9, wherein the one or more content items each include at least one digital asset.

11. The method of claim 6, wherein the first user interface and the second user interface are at least part of a third user interface rendered by another system process.

12. An electronic device comprising:
   a processor configured to:
     receive, by a first system process, a request for one or more content item bundles;
     in response to receiving the request, obtain, by the first system process, the one or more content item bundles for presentation of the one or more content item bundles, wherein the one or more content item bundles are inaccessible to an application process;

receive, by the first system process, a selection of a content item bundle from the presented one or more content item bundles; and in response to receiving the selection:
extract one or more content item locations from the selected content item bundle,
obtain one or more content items from the one or more content item locations, and
provide, by the first system process and to the application process, the one or more content items of the selected content item bundle.

13. The electronic device of claim 12, wherein the processor is further configured to:
render, by the application process and on an electronic display, a first user interface; and
render, by the first system process and on the electronic display, a second user interface,
wherein the first user interface and the second user interface are at least part of a third user interface rendered by another system process.

14. A non-transitory computer-readable medium storing instructions that, when executed by a processor, cause the processor to perform operations comprising:
rendering, by an application process and on an electronic display, a first user interface associated with the application process;
receiving, by the application process, a request for one or more content item bundles;
in response to receiving the request, providing, to a system process, a request for displaying one or more content item bundles on a second user interface for selection by a user, wherein the one or more content item bundles are inaccessible to the application process, wherein the first user interface and the second user interface are at least part of a third user interface rendered by another system process;
in response to providing the request for display of the one or more content item bundles, receiving an indication of a selected content item bundle of the one or more content item bundles; and
in response to receiving the indication, receiving, by the application process, one or more content items of the selected content item bundle.

15. The non-transitory computer-readable medium of claim 14, wherein receiving the request for the one or more content item bundles is in response to a user interaction with a display element of the first user interface.

16. The non-transitory computer-readable medium of claim 14, wherein providing, to the system process, the request for display of the one or more content item bundles causes the system process to obtain the one or more content item bundles from another system process.

17. The non-transitory computer-readable medium of claim 14, further comprising:
in response to receiving the one or more content items of the selected content item bundle, providing, by the application process for display on the first user interface, at least one content item of the one or more content items.

18. The non-transitory computer-readable medium of claim 14, wherein the request for display of the one or more content item bundles comprises an instruction for the system process to sort the one or more content item bundles based on a ranking algorithm.

19. The non-transitory computer-readable medium of claim 14, wherein the request for display of the one or more content item bundles comprises an instruction for the system process to sort the one or more content item bundles based on a respective date associated with each content item bundle.

20. The non-transitory computer-readable medium of claim 14, further comprising:
receiving, by the application process, one or more annotations comprising user-generated content associated with the one or more content items of the selected content item bundle; and
storing, by the application process, the one or more annotations in a data structure associated with the application process.

21. The non-transitory computer-readable medium of claim 14, wherein the selected content item bundle includes one or more content items that relate to a common event.

22. The non-transitory computer-readable medium of claim 21, wherein the one or more content items each include at least one digital asset.

\* \* \* \* \*